United States Patent
Losey

[15] 3,699,301
[45] Oct. 17, 1972

[54] EDM GAP SENSING
[72] Inventor: Jerry E. Losey, Ft. Thomas, Ky.
[73] Assignee: Cincinnati Milacron Inc., Cincinnati, Ohio
[22] Filed: Nov. 8, 1971
[21] Appl. No.: 196,313

[52] U.S. Cl..............219/69 C, 219/69 G, 219/69 S
[51] Int. Cl...........................B23p 1/08, B23p 1/14
[58] Field of Search.......219/69 C, 69 G, 69 P, 69 R, 219/69 S

[56] References Cited

UNITED STATES PATENTS 3,609,281  9/1971  Kauffman................219/69 C

Primary Examiner—R. F. Staubly
Attorney—Howard T. Keiser et al.

[57] ABSTRACT

An apparatus is disclosed for sensing conditions in a machining gap by detecting a current flow therethrough. The normal application of low power pulses from an oscillator circuit to a power switching circuit is delayed for a predetermined period of time. During this period of time, a sensing signal is applied to the machining gap through a high resistance gap sensing circuit; and the current through the sensing circuit is detected thereby providing an accurate and reliable indicator of conditions in the machining gap.

5 Claims, 2 Drawing Figures

EDM GAP SENSING

BACKGROUND OF THE INVENTION

The invention relates generally to the problem of detecting electrical conditions in a machining gap in an EDM process. Specifically, by using a unique apparatus for detecting current in the machining gap, the invention discloses an apparatus for sensing gap conditions which has particular utility when machining with large peak currents and very short ON times.

One of the greatest problems in the EDM process is sensing electrical conditions in the machining gap. There are presently numerous methods of sensing a variety of variables during the machining process. Further, the sensing of one variable may be used to initiate a number of controls over the process. One typical sensing method is comprised of measuring the ionization voltage during a discharge and taking the appropriate action when this voltage drops below a predetermined reference level.

Using the ionization voltage as a reference variable has several disadvantages. The development of the ionization voltage is transient in nature and is a function of the circuit inductance contained within the power supply and its connecting cables. The circuit inductance controls the rate of change of current through the circuit; and hence, the transient nature of the ionization voltage. The situation is further aggravated by the fact that the circuit inductance varys as a function of the cable length from the power supply, and the manner in which the cables are connected by the operator on the machine. Therefore, in order to give the ionization voltage a time to stabilize, the measurement of the ionization voltage is typically delayed for a predetermined period of time after a discharge occurs. When machining with typical magnitudes of ON time and peak current, the present systems for measuring the ionization voltage to sense gap conditions are adequate. However, with newer power supplies having higher peak currents and substantially shorter ON times, there may not be sufficient time to reliably measure the ionization voltage before the ON time is terminated. If the time delay of the ionization voltage measurement is shortened, the ionization voltage is then detected before it has stabilized and erroneous information results. Consequently, the use of the ionization voltage as a variable for monitoring gap conditions places a severe limitation on the permissible ON times that can be used with larger peak currents.

Applicant discloses an apparatus which allows one to measure conditions in the machining gap independently of the circuit inductance; and hence, the ON time - peak current capability of the power supply is not degraded.

SUMMARY OF THE INVENTION

Applicant claims an apparatus for use in an EDM power supply of the type comprised of a power switching circuit responsive to a DC source and low power pulses from an oscillator circuit. The power switching circuit produces output machining pulses to a machining gap formed between an electrically conductive tool and an electrically conductive workpiece. A control circuit is responsive to each of the low power pulses for producing a control signal for a predetermined period of time. A switching circuit is connected between the oscillator circuit and the power switching circuit for electrically disconnecting the oscillator circuit from the power switching circuit in response to the control signal. A high resistance sensing circuit is connected between the DC source and the machining gap for applying a sensing signal to the machining gap during the predetermined period of time. A current detection circuit is responsive to the sensing signal for detecting current through the machining gap thereby providing an accurate and reliable indication of electrical conditions in the machining gap.

DESCRIPTION OF THE PREFERRED EMBODIMENT

Figure 1:
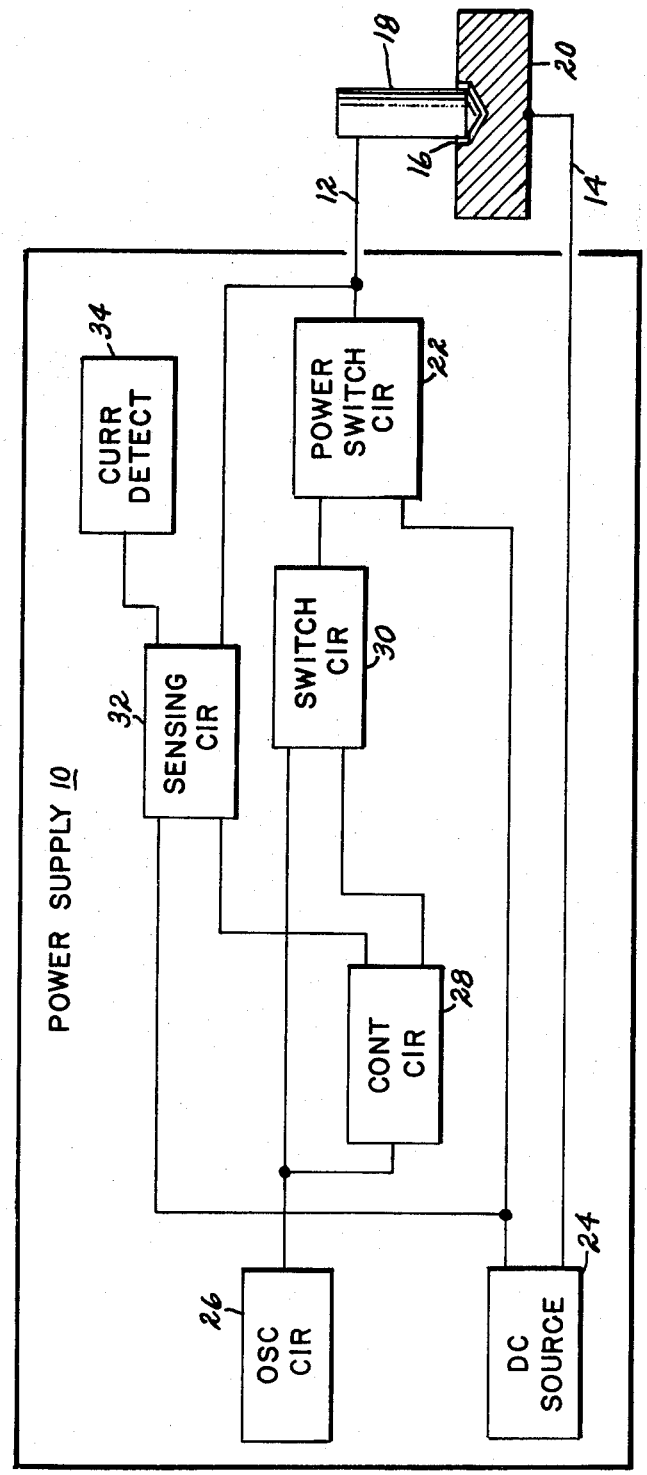
FIG. 1 is a general block diagram illustrating applicant's invention.

FIG. 1 is a general block diagram of applicant's invention. Typically, a power supply 10 produces machining pulses on output lines 12 and 14 which are applied to a machining gap 16 formed between an electrically conductive tool 18 and an electrically conductive workpiece 20. When gap conditions are proper, the machining pulses are operative to produce electrical discharges across the machining gap thereby removing material from the workpiece. During the machining process, the tool and workpiece are submersed in a dielectric medium; and the displacement between the tool and workpiece is controlled in a manner well-known to those who are skilled in the art. The machining pulses are produced by a power switching circuit 22 which switches an output of a DC source 24 in response to low power pulses from an oscillator circuit 26. The low power pulses have a pulse duration or ON time and a pulse duration between pulses or OFF time for controlling the pulse width and repetition rate of the machining pulses on the power supply output. A control circuit 28 is responsive to the low power pulses and operates in conjunction with a switching circuit 30 to inhibit the application of low power pulses to the switching circuit. The control circuit 28 is responsive to each of the low power pulses for producing a control signal for a predetermined period of time. The control signal energizes the switching circuit 30 and disconnects the oscillator 26 from the power switching circuit 22. During the predetermined period of time, a sensing circuit 32 is responsive to the control circuit 28 and the DC source 24 for applying a sensing signal to the machining gap. The sensing circuit 32 is designed to have a large resistive component which is very much greater than the inductance of the discharge path; and therefore, it will produce a discharge across the gap having a current signal approaching an ideal square wave form. The current detector 34 is responsive to the sensing signal for detecting a current signal through the machining gap. Since the current signal is very near a square wave, a very accurate measurement of current may be obtained. At the end of the predetermined period of time, the control circuit 28 terminates the control signal and the sensing signal. In the absence of the control signal, the switching circuit 30 is operative to apply the low power pulses from the oscillator circuit 26 to the power switching circuit 22. The above apparatus produces a sensing signal for one or very few number of microseconds which permits an accurate and reliable sensing of gap conditions when machining with large peak currents and ON times of very short duration.

Figure 2:
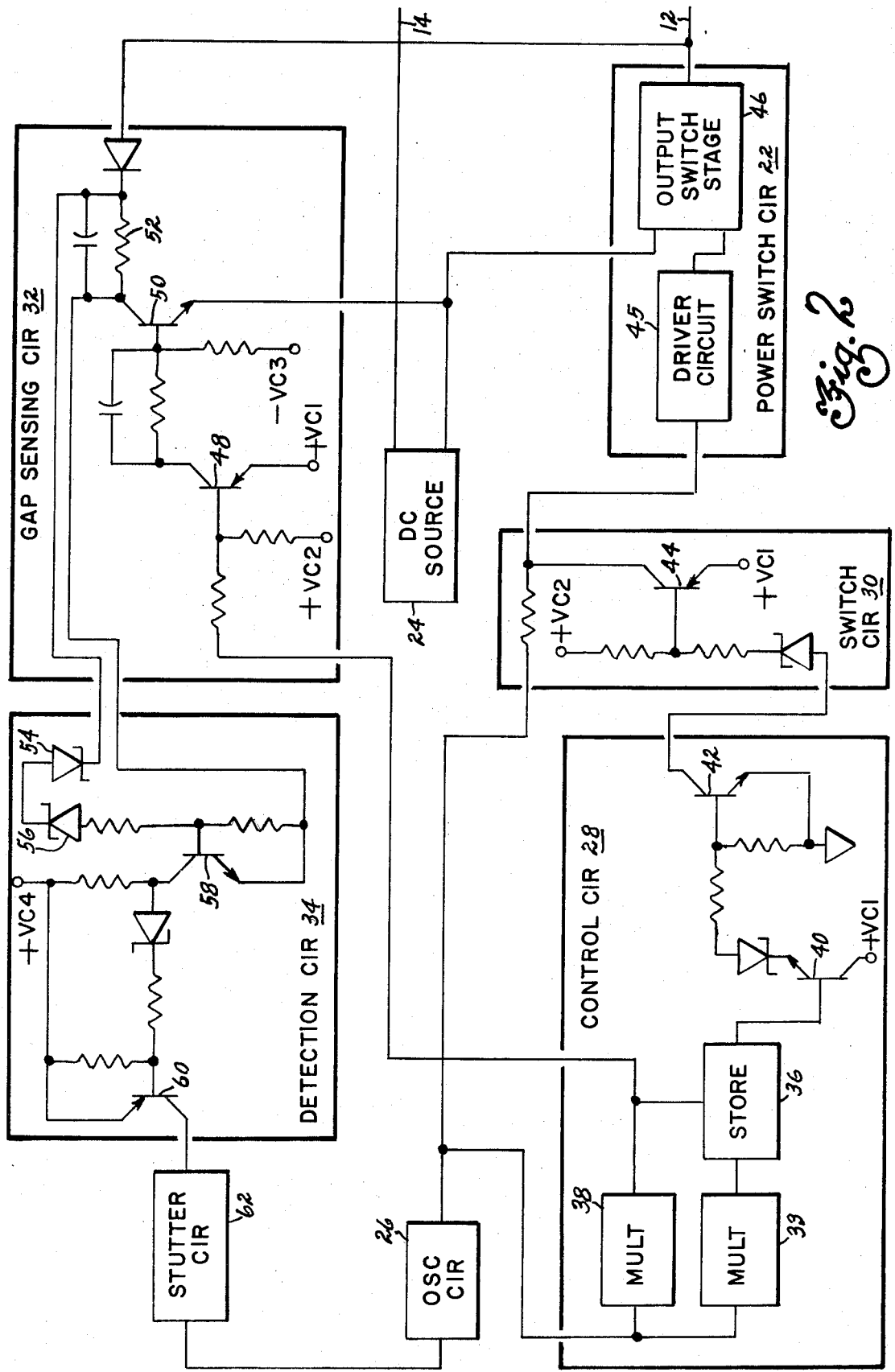
FIG. 2 is a detailed schematic diagram of the preferred embodiment of applicant's invention.

FIG. 2 is a detailed schematic diagram of the preferred embodiment of the invention. Within the control circuit 28, a monostable multivibrator 33 is responsive to the trailing edge of the ON time of the low power pulses from the oscillator circuit 26. A storage device 36, typically a flip-flop, is connected to the multivibrator 33 and produces an output signal which is initiated by an output pulse from the multivibrator 33. The output signal from the storage device 36 is operative to switch transistors 40 and 42 into conduction and to produce the control signal from the control circuit 28 to an input of the switching circuit 30. The switching circuit 30 is comprised of a transistor 44 which is switched into conduction in response to the control signal. The transistor 44 shunts the output of the oscillator circuit 26, thus disconnecting the oscillator circuit 26 from the power switching circuit 22. It should be noted that the particular design of the switching circuit 30 is not critical to the invention. For example, the switching circuit may be a series switch instead of the illustrated shunt switch.

The multivibrator 33, the initiation of the control signal and the operation of the switching circuit 30 is responsive to the trailing edge of the ON time of the low power pulses. Therefore, the oscillator circuit 26 is disconnected from the power switching circuit 22 through most of the OFF time and through the leading edge of the ON time. The leading edge of the ON time of the low power pulses energizes a monostable multivibrator 38 which produces a timing pulse to the gap sensing circuit 32. This timing pulse switches transistors 48 and 50 into conduction. The emitter of transistor 50 is connected to the DC source 24; and therefore, the sensing circuit 32 appears as a typical output switching stage and is operative to apply a sensing signal to the machining gap. However, there is one major difference between the sensing circuit 32 and a typical output switching stage. The collector resistor 52 of transistor 50 is very large when compared to the load resistance of the power switching circuit 22, e.g., the resistor 52 may typically be 100 times greater than the load resistance of the power switching circuit 22. This large resistive component substantially reduces the time constant of the circuit comprised of the sensing circuit 32 and machine gap 16 to a range of from $0.02 \times 10^{-6}$ to $0.06 \times 10^{-6}$. Therefore, current transitions in this circuit will approximately follow the input or sensing signal. Since the sensing signal is a square wave, the current transitions through resistor 52 will closely approximate a square wave. Consequently, the current signal through resistor 52 provides a very stable detection variable. This is especially true when machining with large peak currents and very short ON times. Under these circumstances, the prior art systems are difficult to regulate and very inconsistent. Further, the detection of current can be done immediately in response to an oscillator pulse, whereas the detection of ionization voltage requires a certain time delay until the discharge has stabilized.

On the trailing edge of the timing pulse from the monostable multivibrator 38, the transistors 48 and 50 are switched back to their non-conductive state; and the sensing signal is terminated. In addition, the storage device 36 is reset by the trailing edge of the timing pulse from the multivibrator 38. Consequently, transistors 40 and 42 are switched back to their non-conductive state, and the control signal is terminated. The transistor 44 in the switching circuit 30 is switched to its non-conductive state, and the low power pulses from the oscillator circuit 26 are applied to the drive circuit 45 within the power switching circuit 22. The drive circuit 45 is operative to energize the output switching stage 46 thereby producing machining pulses from the power switching circuit 22.

Inputs to a detection circuit 34 are connected across the resistor 52. Zener diodes 54 and 56 are used to define a particular detection level. If the current through resistor 52 does not exceed a predetermined value, the conditions in the machining gap are adequate to sustain a subsequent discharge. However, if the current through resistor 52 exceeds a predetermined level, the conditions in the machining gap will not adequately support a subsequent discharge. In this case, transistors 58 and 60 are switched into conduction; and a signal is applied to a stutter circuit 62. The details of the stutter circuit are shown in the prior art. Specifically, U.S. Pat. No. 3,483,847 granted on Dec. 9, 1969, to the present inventor and assigned to the same assignee as the present application discloses a stutter circuit which may be used with the present invention. As will be appreciated by those who are skilled in the art, the use of a stutter circuit is only an example of a corrective action that may be employed. The sensing apparatus disclosed herein may be used to initiate a machining pulse energy control or a circuit for terminating the output of machining pulses. Further, the sensing circuit may be used to alter the flow rate of dielectric through the machining gap or may be used to initiate a change in the magnitude of the machining gap. When a signal is output from the detection circuit, the stutter circuit 62 initiates the stutter operation. When the current through resistor 52 does not reach the predetermined level, no signal is produced by the detection circuit 34; and the operation of the stutter circuit 62 is inhibited.

In the discussion above, because the ON time is delayed by the control signal from the control circuit, the actual machining ON time will be less than the preselected duration. This can be compensated for by an adjustment in the oscillator circuit 26. Typically, the oscillator circuit is comprised of a free running multivibrator. One side of the multivibrator defines the ON time while the other defines the OFF time. When using the apparatus of the present invention, the free running multivibrator may be modified by increasing the ON time a fixed duration (via a fixed resistor) an amount equal to the predetermined period of time defined by the control signal. In this way, the ON time of the machining pulses will correspond to the selected ON time duration.

While the invention has been illustrated in some detail according to the preferred embodiments shown in the accompanying drawings and while the preferred illustrated embodiments have been described in some detail, there is no intention to limit the invention to such detail. On the contrary, it is intended to cover all modifications, alternations and equivalents falling within the spirit and scope of the appended claims.

What is claimed is:

1. A circuit for use with an EDM power supply comprised in part of a power switching circuit responsive to a DC source and an oscillator circuit for producing output machining pulses to a machining gap, wherein the improvement comprises:
   a. means connected to the oscillator circuit for inhibiting the occurrence of each machining pulse for a predetermined period of time;
   b. means connected between the machining gap and the DC source and responsive to the inhibiting means for applying a sensing signal to the machining gap during said predetermined period of time; and
   c. means responsive to the sensing signal for measuring current through the machining gap during the predetermined period of time.

2. A circuit for use with an EDM power supply comprised in part of a power switching circuit responsive to a DC source and low power pulses from an oscillator circuit for supplying, on a power supply output, machining pulses to a machining gap, wherein the improvement comprises:
   a. means responsive to each of the low power pulses for producing a control signal for a predetermined period of time;
   b. means connected between an oscillator circuit and the power switching circuit and responsive to the control signal for electrically disconnecting the oscillator circuit from the power switching circuit in response to the control signal;
   c. means connected between the DC source and the power supply output and responsive to the producing means for applying a sensing signal to the machining gap in response to each of the low power pulses; and
   d. means responsive to said sensing signal for detecting a current signal through the machining gap during the predetermined period of time.

3. The apparatus of claim 2 wherein the applying means comprises a sensing circuit having a resistance approximately 100 times greater than the resistance of the power switching circuit.

4. The apparatus of claim 3 wherein the resistance of the sensing circuit has a magnitude for producing a time constant in the range of from $0.02 \times 10^{-6}$ to $0.06 \times 10^{-6}$ in a circuit comprised of said sensing circuit and the machining gap.

5. A circuit for use with an EDM power supply comprised in part of a power switching circuit responsive to a DC source and low power pulses from an oscillator circuit for supplying machining pulses to a machining gap formed between an electrically conductive tool and an electrically conductive workpiece, wherein the improvement comprises:
   a. a control circuit responsive to the oscillator circuit for producing,
      1. a timing signal in response to a leading edge of each of the low power pulses and having a duration of a predetermined period of time, and
      2. a control signal having a duration at least equal to the duration of said timing signal,
   b. a switching circuit connected to the oscillator circuit and responsive to the control signal for terminating the application of low power pulses from the oscillator circuit to the power switching circuit;
   c. a gap sensing circuit connected between the machining gap and the DC source and responsive to the timing signal for applying a sensing signal to the machining gap; and
   d. a detection circuit connected to the gap sensing circuit for measuring current therethrough in response to the sensing signal.

* * * * *